(12) United States Patent
Zhang et al.

(10) Patent No.: US 12,056,214 B1
(45) Date of Patent: Aug. 6, 2024

(54) SYSTEMS FOR AUTOMATICALLY CORRECTING CATEGORIES OF ITEMS

(71) Applicant: AMAZON TECHNOLOGIES, INC., Seattle, WA (US)

(72) Inventors: Zhilin Zhang, Burnaby (CA); Manjuan Duan, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/936,753

(22) Filed: Sep. 29, 2022

(51) Int. Cl.
*G06F 18/243* (2023.01)
*G06F 18/22* (2023.01)
*G06N 20/00* (2019.01)

(52) U.S. Cl.
CPC ............ *G06F 18/243* (2023.01); *G06F 18/22* (2023.01); *G06N 20/00* (2019.01)

(58) Field of Classification Search
None
See application file for complete search history.

(56) References Cited

U.S. PATENT DOCUMENTS

| | | | |
|---|---|---|---|
| 11,301,540 B1* | 4/2022 | Boteanu | G06F 40/279 |
| 2017/0235848 A1* | 8/2017 | Van Dusen | G06Q 10/101 |
| | | | 705/12 |
| 2021/0241341 A1* | 8/2021 | Sharnagat | G06Q 30/0627 |
| 2021/0241342 A1* | 8/2021 | Naidu | G06F 16/24522 |
| 2021/0241363 A1* | 8/2021 | Yang | G06N 20/00 |
| 2021/0312531 A1* | 10/2021 | Mcginnis | G06Q 10/087 |
| 2022/0207507 A1* | 6/2022 | Berg | G06N 20/00 |
| 2022/0398445 A1* | 12/2022 | Polleri | G06F 16/3347 |
| 2023/0260249 A1* | 8/2023 | Dunay | G06V 10/761 |

* cited by examiner

*Primary Examiner* — Mark D Featherstone
*Assistant Examiner* — Kweku William Halm
(74) *Attorney, Agent, or Firm* — Lindauer Law, PLLC

(57) ABSTRACT

To determine whether an incorrect category has been associated with an item, the characteristics of the items that are associated with that category are used to determine a representative set of characteristics. If the characteristics of the item differ from the representative set, the item may be associated with a different category by determining a category of items having characteristics similar to those of the item. For an item with associated parent and child categories, the parent categories of other items having the same child category may be compared to the parent category of the item. If the parent categories differ, the item may be associated with a different category by determining a category of items having characteristics similar to those of the item.

20 Claims, 5 Drawing Sheets

SYSTEMS FOR AUTOMATICALLY CORRECTING CATEGORIES OF ITEMS

BACKGROUND

Items that are available from an online store or other entity may sometimes be miscategorized within a catalog, database, or other source of data regarding the items, resulting in suboptimal results when searching for items and improper payment of commissions or other fees associated with purchases. Identifying miscategorized items typically requires manually reviewing each item to verify that the item is miscategorized and to assign an appropriate category to the item.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
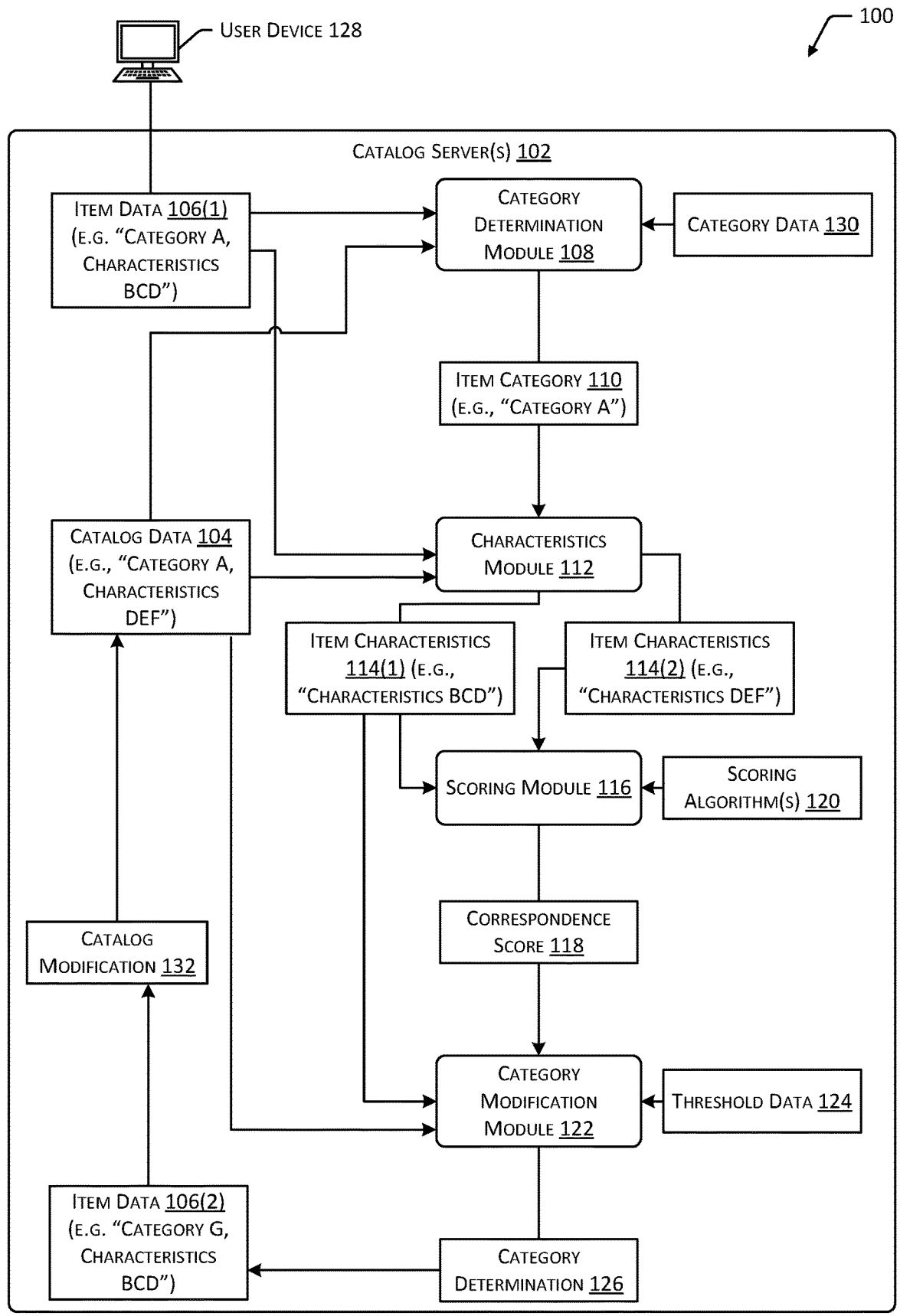
FIG. 1 is a block diagram depicting an implementation of a system for automatically determining possible miscategorization of an item based on characteristics of the item.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to coverall modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Online stores and other types of entities that offer items (e.g., goods and services) for purchase, lease, subscription, and so forth typically access a catalog, database, or other source of data that includes various characteristics of the items, such as a text description, reviews of the item, a price, dimensions, materials, shipping options, and so forth. Each item may be associated with one or multiple categories. For example, categories of items may include a tree structure in which the category "clothing" is a parent category, while "shoes" is a subcategory of "clothing", "men's shoes" is a subcategory of "shoes", and "running shoes" is a subcategory of "men's shoes". Many users that search for items may search using categories. Additionally, the category that is associated with an item may affect various administrative practices for the item, such as inventory, pricing, shipping options, commissions or other fees paid to sellers, and so forth. When an item is associated with an incorrect category, this may cause a user searching for a particular type of item to be presented with irrelevant search results, or a user searching for a miscategorized item to have difficulty locating the item. Additionally, if an item is miscategorized, this may cause suboptimal inventory, pricing, shipping, or commission practices to occur. In some cases, an item may be miscategorized by a malicious actor, such as to obtain a favorable commission rate. In other cases, an item may be unintentionally miscategorized due to user error. In still other cases, an item may be properly categorized, but subsequent changes to categories associated with a catalog of items may cause a category that was previously appropriate to no longer be an optimal category for the item.

Typically, to identify a miscategorized item, the characteristics of an item, such as the text used to describe the item in a written description, the price of the item, text used in user reviews of the item, and so forth may be compared to a template of characteristics expected for a particular category. If the characteristics of an item differ significantly from the characteristics expected for the category associated with the item, this may indicate a possible miscategorized item, and human review may be used to verify that the item has been miscategorized and to select a new category to associate with the item. For large catalogs of items, this process may be prohibitively time-intensive and resource-intensive.

Described in this disclosure are techniques for automatically determining miscategorized items and associating other categories with miscategorized items, without requiring manual review by human users. A particular item may be associated with a first category, and a first set of characteristics. Other items associated with the first category may be determined, each of the other items being associated with a respective second set of characteristics. The second sets of characteristics may be used to determine a representative set of characteristics for the first category. For example, characteristics of items associated with the first category that co-occur at least a threshold number of times may be included in the representative set for the category. Characteristics that are selected for inclusion in a representative set of characteristics for the first category may be selected to cause the representative set for the first category to be unique from representative sets of characteristics for other categories. For example, the representative sets of characteristics for other categories may be used as inputs when determining the representative set for the first category. In some implementations, a machine learning system may be used to determine co-occurrences of characteristics among different items within the first category, and based on the respective second sets of characteristics for the items and one or more threshold values, may determine the representative set of characteristics. One or more differences between the characteristics of the particular item and the representative set of characteristics may be determined. In some implementations, the difference(s) may be represented as a vector value that indicates a count of differences and a magnitude of the difference(s). In other implementations, the differences may be represented as a score, or in some cases, a score may be determined based on a vector value. If the score determined for the particular item differs from a threshold score by at least a threshold value, this may indicate that the particular item has been miscategorized. For example, differences between the characteristics of the first item and the representative set of characteristics for the first category may indicate that the first category is unlikely to be properly associated with the particular item.

In response to the score for the particular item differing from the threshold score by at least a threshold value, other items having characteristics similar to those of the particular item may be automatically determined. A second category that is associated with at least a threshold portion of those items may then be associated with the particular item. When this process is performed at a subsequent time, the accuracy of these determinations may be improved due to the association of the particular item with a more accurate category. Each time that this process is performed, the process may become more accurate due to the association of one or more items with a more accurate category.

Implementations described herein may also be used to determine whether an item has been miscategorized using an incorrect parent category based on characteristics of a child category associated with the item. For example, a particular item may be associated with a first category and a second category. The first category may be a subcategory of the second category (e.g., the second category and first category may have a direct or indirect parent-child relationship). Other items associated with the first category may be determined. For each of these other items, a parent category may be determined. Parent categories that occur for at least a threshold number of the other items may be determined to be a list of acceptable parent categories for the particular item. If the parent category for the particular item is not included in this list, or is not within a threshold similarity of the categories included in the list, this may indicate that the particular item is miscategorized. In response to this determination, other items having characteristics similar to those of the particular item may be automatically determined. A parent category that is associated with at least a threshold portion of those items may then be associated with the particular item.

In some implementations, similarity data may be determined that associates parent categories for multiple child categories with other parent categories that co-occur for at least a threshold number or a threshold portion of child categories. For example, if the categories "athletic shoes" and "sporting goods" frequently co-occur, this may indicate that these are similar or comparable categories. In such a case, the list of acceptable parent categories for the particular item may also include other categories that are indicated by the similarity data to be similar or comparable to the categories on the list. If the parent category for the particular item is not included in the list of acceptable parent categories, or any of the categories that are similar or comparable to a category in the list, or if the parent category is not within a threshold similarity of the categories, this may indicate that the particular item is miscategorized, and a more accurate category may be automatically determined in the manner described previously.

Implementations described herein may therefore enable miscategorized items to be identified automatically, without requiring manual intervention. For example, the characteristics or parent categories of similar items may be used to determine whether a category for a particular item may be inaccurate. Then, if a miscategorized item is determined, the item may be automatically associated with a more accurate category by determining categories that are associated with items having similar characteristics. Threshold values may be selected to affect the number of items that are identified as potentially miscategorized. For example, a larger threshold would result in greater precision by identifying a smaller number of potentially miscategorized items, with a high confidence that the items are miscategorized. A smaller threshold would result in determination of a larger number of potentially miscategorized items. Therefore, selection of a threshold value may be based on a target number or target portion of items to be identified as potentially miscategorized. However, even in cases where an item is associated with an appropriate category, a more accurate category may be identified based on categories associated with items having similar characteristics. Additionally, in cases where an item that is identified as potentially miscategorized is not miscategorized, performance of the process described above would result in the item being associated with the same category. Each correction of a miscategorized item may improve the accuracy of this process for subsequent uses. For example, by removing items from incorrect categories and adding items to correct categories, subsequent representative sets of item characteristics and subsequent lists of parent categories would become more accurate, enabling miscategorized items to be identified with greater confidence.

FIG. 1 is a block diagram 100 depicting an implementation of a system for automatically determining possible miscategorization of an item based on characteristics of the item. One or more catalog servers 102 may store catalog data 104 that represents various items (e.g., goods or services) that may be available for purchase, lease, subscription, and so forth by accessing the catalog server(s) 102, or one or more other computing devices in communication with the catalog server(s) 102. For example, the catalog server(s) 102 may include one or more computing devices associated with an online store or similar type of entity, or one or more other computing devices that access the catalog server(s) 102 may be associated with the online store or other entity. While FIG. 1 depicts a single block diagram 100 representing a catalog server 102, any number and any type of similar or dissimilar computing devices may be used to perform the functions described herein including, without limitation, personal computing devises, portable or wearable computing devices, servers, networked media devices, set top boxes, game controllers, and so forth.

The catalog data 104 may represent an item using an item identifier, such as a name, alphanumeric string, or other type of data that may be used to differentiate a particular item from other items. Each item identifier may be stored in association with an indication of one or more characteristics of the item. Characteristics may include one or more terms found in text that describes the item, an item price, materials, dimensions, a rating or review score, text associated in reviews of the item, shipping options, geographic availability, available variants of the item, and so forth. Each item identifier may be also stored in association with an indication of one or more categories that are associated with the item. For example, a set of categories may include a hierarchal tree structure in which each item identifier may be associated with multiple levels of the tree structure, such as a broad category (e.g., a root node), a first subcategory (e.g., a branch node) of the broad category, a second subcategory (e.g., a leaf node) of the first subcategory, and so forth. In some cases, the lowest level category of the tree structure associated with an item may include a browse node. In other implementations, a set of categories may include one or more labels that indicate a product type of an item, independent of a hierarchal tree structure. In still other implementations different categories associated with an item may include different tree structures or other types of data structures. For example, a first category associated with an item may include a browse node (e.g., a leaf node) category associated with the item. The browse node may be part of a hierarchal tree structure, such as the lowest level within the tree structure. A second category associated with the item may include a product type category that may not necessarily be associated with the same tree structure as the bottom-level browse node.

The catalog server(s) 102 may also store or access item data 106(1) indicative of an item identifier, one or more categories, and one or more characteristics of a particular item. In other implementations, the catalog server(s) 102 may receive item data 106(1) from a user device 128, such as a computing device associated with the seller of an item. While FIG. 1 depicts a single user device 128, the user device 128 may include any number and any type of computing device(s) including, without limitation, the types of computing devices described with regard to the catalog server(s) 102. Additionally, while FIG. 1 conceptually depicts the item data 106(1) and catalog data 104 as separate elements, in some implementations, the item data 106(1) may represent a single item included in the catalog data 104. The catalog server(s) 102 may determine whether one or more categories associated with the item represented by the item data 106(1) are inaccurate or suboptimal categories based on the characteristics of the item indicated in the item data 106.

A category determination module 108 associated with the catalog server(s) 102 may determine an item category 110 of the item represented by the item data 106(1). As described previously, the item data 106(1) may indicate one or more categories associated with the item. The category determination module 108 may be configured to determine portions of the item data 106(1) that are indicative of item categories 110. In some implementations, the category determination module 108 may access the catalog data 104 to determine categories that are associated with various items. For example, indications of categories that occur at least a threshold number of times in the catalog data 104 may be determined as current categories in use by an online store or other entity. In other implementations, the category determination module 108 may access category data 130 indicative of item categories 110 associated with the online store or entity. Correspondence between the determined categories and the item data 106(1) may be used to determine the particular item category 110 associated with the item represented by the item data 106(1). While FIG. 1 depicts the item data 106(1) indicating a single item category 110, in other implementations, multiple item categories 110 may be determined based on the item data 106(1), such as a broad category, and a sub-category of the broad category.

A characteristics module 112 associated with the catalog server(s) 102 may determine item characteristics 114(1) of the item represented by the item data 106(1). As described previously, the item data 106(1) may indicate one or more characteristics associated with the item. The characteristics module 112 may be configured to determine portions of the item data 106(1) that are indicative of item characteristics 114. In some implementations, the characteristics module 112 may access the catalog data 104 to determine characteristics that are associated with various items. In some cases, characteristics that occur for at least a threshold number of items in the catalog data 104 may be indicative of characteristics that are currently in use by an online store or other entity. In other implementations, the characteristics module 112 may access other data indicative of item characteristics 114 associated with the online store or other entity. The item characteristics 114(1) associated with the item may include any number and any type of characteristics. For example, a bicycle may include characteristics such as sizes, types, or other values relating to traits such as "wheels", "frame", "seat", and so forth. A laptop computer may include characteristics such as "dimensions", "weight", "RAM", and "storage space". Typically, items that are associated with the same or similar categories would have a larger probability of including similar item characteristics 114, while an item that includes a large number of item characteristics 114 that are not associated with other items having the same item category 110 may potentially be associated with an incorrect category.

The characteristics module 112 may also determine item characteristics 114(2) associated with a subset of the items represented by the catalog data 104. Based on the item category 110 of the item represented by the item data 106, the characteristics module 112 may determine a subset of the items in the catalog data 104 that are associated with the same item category 110. In some implementations, the characteristics module 112 may also determine items associated with categories that have been determined to be similar or comparable to the item category 110. The characteristics module 112 may then determine item characteristics 114(2) that are associated with this subset of items represented by the catalog data 104. As described previously, items having the same item category 110 as the item represented by the item data 106(1) would have a larger probability of being associated with similar item characteristics 114 to those of the item represented by the item data 106. In some implementations, the item characteristics 114(2) may be used to determine a representative set of characteristics associated with the item category 110. For example, a set of item characteristics 114(2) that occurs at least a threshold number or portion of times within the item category 110 and differs by at least a threshold amount from the representative sets of characteristics for other item categories may be used as a representative set of characteristics for the item category 110 indicated in the item data 106(1).

A scoring module 116 associated with the catalog server(s) 102 may determine a correspondence score 118 based on correspondence between the item characteristics 114(1) determined based on the item data 106 and the item characteristics 114(2) determined based on the subset of items from the catalog data 104 that have the same item category 110 that was determined based on the item data 106(1). The scoring module 116 may access scoring algorithms 120 which may include various rules, algorithms, weights, thresholds, and so forth that may be used to determine the correspondence score 118 based on differences between the item characteristics 114(1) associated with the item data 106(1) and the item characteristics 114(2) associated with the catalog data 104. For example, different item characteristics 114 may be associated with different weights. Additionally, different types or magnitudes of differences may be associated with different weights. For example, if a value for a particular item characteristic 114(1) for the item data 106(1) differs from values for this item characteristic 114(2) indicated in the catalog data 104, this may be associated with a first weight when determining the correspondence score 118. However, if the item characteristics 114(1) associated with the item data 106(1) do not include an item characteristic 114(2) that is present for a large number of items represented by the catalog data 104, or include an item characteristic 114(1) that is not present for any items or is only present for a small number of items represented by the catalog data 104, this may be associated with a second weight that is greater than the first weight. The number and magnitude of differences between the item characteristics 114(1) associated with the item data 106 and the item characteristics 114(2) associated with the catalog data 104 may therefore affect the correspondence score 118. In some cases, the correspondence score 118 may include a numerical value, in which a larger value represents a greater likelihood that the item represented by the item data 106(1) is miscategorized. In other cases, a smaller numerical value may represent a greater likelihood that the item is miscategorized. In other implementations, the correspondence score 118 may include non-numerical indications, such as qualitative indications of the differences between the item characteristics 114(1) associated with the item data 106 and the item characteristics 114(2) associated with the catalog data 104.

A category modification module 122 associated with the catalog server(s) 102 may determine correspondence between the correspondence score 118 and threshold data 124, which may indicate one or more threshold scores, threshold values, rules or algorithms for determining differences between the correspondence score 118 and threshold scores, and so forth. For example, if the correspondence score 118 differs from a threshold score by at least a threshold value, this may indicate that the item category 110 associated with the item represented by the item data 106(1) is potentially inaccurate or suboptimal. If the correspondence score 118 corresponds with one or more threshold scores, this may indicate that it is unlikely that the item represented by the item data 106 is miscategorized.

If the correspondence score 118 differs from a threshold score by at least a threshold value, the category modification module 122 may determine a set of items associated with the catalog data 104 having item characteristics 114(2) that correspond to the item characteristics 114(1) of the item represented by the item data 106(1). As described previously, items associated with similar item characteristics 114 are more likely to be associated with the same category or a similar category than items with significantly different item characteristics 114. The category modification module 122 may determine a category that occurs at least a threshold number of times in the set of items associated with the catalog data 104, or occurs for at least a threshold portion of the items in the set, and generate a category determination 126 indicative of this category. The item data 106(1) may then be modified to associate the item represented by the item data 106 with the category indicated in the category determination 126. As a result, if the item category 110 is not accurate, the category determination 126 may replace the item category 110 with a more accurate item category. For example, FIG. 1 depicts the category determination module 126 generating item data 106(2) that replaces a category associated with the initial item data 106(1) with a category determined using the category modification module 122. Additionally, in cases where an item category 110 is appropriate but potentially suboptimal, performance of this process may enable a more optimal category to be determined and associated with the item. In cases where the item represented by the item data 106 is incorrectly identified as miscategorized (e.g., a false positive), the category determination 126 may identify that the item category 110 currently associated with the item is the optimal category, and as a result, the accurate item category 110 would not be changed.

Figure 2:
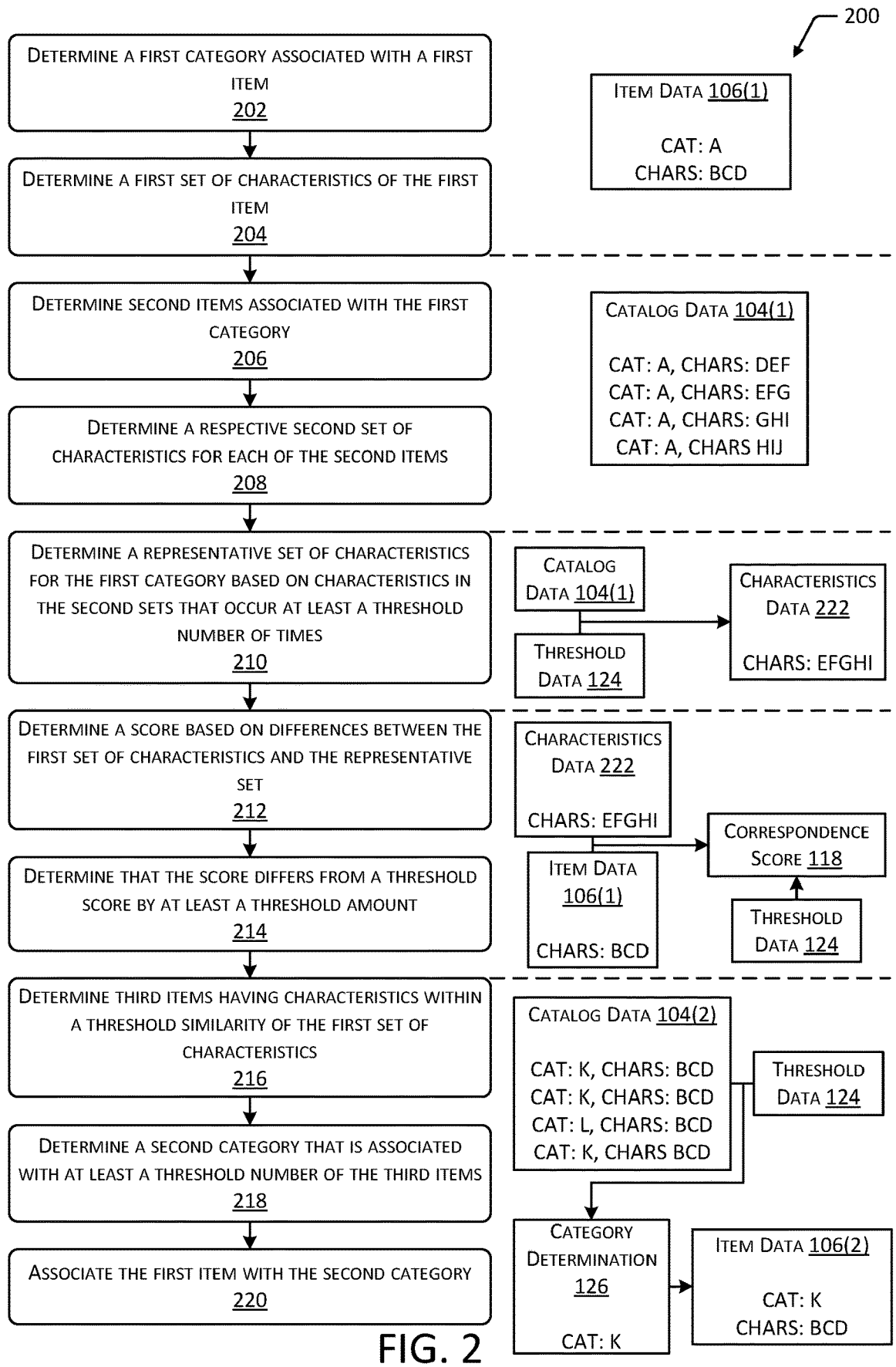
FIG. 2 is a flow diagram depicting an implementation of a method for automatically determining possible miscategorization of an item based on characteristics of the item.

FIG. 2 is a flow diagram 200 depicting an implementation of a method for automatically determining possible miscategorization of an item based on characteristics of the item. At 202, a first category associated with a first item may be determined. For example, as described with regard to FIG. 1, item data 106(1) that represents an item may associate an item identifier with one or more item categories 110 and one or more item characteristics 114(1). A category determination module 108 or other module associated with a catalog server 102 or other type of computing device may determine the item category 110 of the item based on the item data 106. As described with regard to FIG. 1, the category determination module 108 may access catalog data 104(1) to determine item categories 110 that are in use by an online store or other entity. The category determination module 108 may determine correspondence between the item data 106 and the determined item categories 110 to determine the portion of the item data 106 indicative of an item category 110 used by the online store or other entity. In other implementations, the category determination module 108 may access category data 130 indicative of item categories 110 and may determine correspondence between the category data 130 and the item data 106.

At 204, a first set of characteristics of the first item may be determined. As described with regard to FIG. 1, a characteristics module 112 or other module associated with the catalog server 102 or other type of computing device may determine item characteristics 114(1) of the first item based on the item data 106(1). The determined item characteristics 114(1) may include an indication of the characteristics themselves, such as the characteristics "wheel size" and "frame materials" for a bicycle. The determined item characteristics 114(1) may also include values for the identified characteristics, such as a "wheel size" of "26 inches". In some implementations, an embedding value may be determined based on one or more characteristics of the item associated with the item data 106.

At 206, second items associated with the first category may be determined. For example, a catalog server 102 or other type of computing device may access catalog data 104, which may associate item identifiers for multiple items with corresponding respective sets of item categories 110 and item characteristics 114(2). Based on the determined item category 110 of the first item, other items represented in the catalog data 104 having a category that matches or is determined to be similar to the item category 110 may be determined.

At 208, a respective second set of characteristics for each of the second items is determined. As described with regard to FIG. 1, the characteristics module 112 or other module associated with the catalog server 102 or other type of computing device may determine item characteristics 114(2) of the portion of items represented by the catalog data 104 that are associated with the item category 110 of the first item. The determined item characteristics 114(2) may include an indication of the characteristics themselves, as well as values for the determined characteristics. In other implementations, the determined item characteristics 114(2) may be represented by embedding values. For example, differences between embedding values that represent one or more characteristics may be used to determine whether the characteristics associated with the item represented by the item data 106(1) correspond to the characteristics of other items from the catalog data 104(1) that are associated with the same item category 110.

At 210, a representative set of characteristics for the first category may be determined based on characteristics in the second sets that occur at least a threshold number of times. For example, a potentially large number of total item characteristics 114(2) may occur among every item of the catalog data 104 that is associated with the item category 110. Because each item may be associated with potentially unique or uncommon characteristics, or characteristics that are not related to the category of the item, one or more of the item characteristics 114(2) may not be representative of or related to the item category 110 of the second items. However, item characteristics 114(2) that occur at least a threshold number of times among the second items, or occur for at least a threshold portion of the second items, shown as characteristics data 222 in FIG. 2, are likely to be characteristics that are representative of the item category 110. In some implementations, a machine learning system may be used to determine co-occurrences of characteristics among different items that are associated with the item category 110. In some cases, the machine learning system, or user input, may be used to select one or more threshold values, such as the number of co-occurrences required for an item characteristic 114(2) to be included in the representative set. In some implementations, the representative sets of characteristics associated with other categories may be used as inputs to determine the representative set of characteristics for the item category 110. For example, the representative set may be selected such that the representative set of characteristics for the item category 110 are not identical or within a threshold similarity of the representative set for another category.

At 212, a score may be determined based on differences between the first set of characteristics and the representative set. For example, one or more of a count or magnitude of differences between the item characteristics 114(1) for the first item and the item characteristics 114(2) for the second items may be used to determine a correspondence score 118. In other implementations, a difference between embedding values that represent the item characteristics 114(1) and the representative set may be determined. In some cases, the catalog server 102 or other computing device may access scoring algorithms 120, which may indicate various rules, algorithms, weighs, thresholds, and so forth that may be used to determine the correspondence score 118 based on the sets of item characteristics 114.

At 214, a determination may be made that the score differs from a threshold score by at least a threshold amount. For example, a correspondence score 118 may represent a confidence value based on whether the first item is miscategorized, or in other cases, the correspondence score 118 may be used to determine a confidence value. If the correspondence score 118 differs from a threshold score by at least a threshold amount, this may indicate that the item category 110 associated with the first item is potentially inaccurate.

At 216, third items having characteristics within a threshold similarity of the first set of characteristics may be determined. For example, in response to a determination that the correspondence score 118 differs from a threshold score by at least a threshold value, a category modification module 122 or other module associated with the catalog server 102 or other computing device may determine correspondence between the item characteristics 114(1) of the first item and catalog data 104 that includes characteristics 114 of other items. Based on this correspondence, a third set of items having characteristics that are similar to the item characteristics 114(1) of the first item may be determined. As described previously, items having characteristics that are similar to the characteristics of the first item are likely to be associated with the same item category 110 or a similar item category 110.

At 218, a second category that is associated with at least a threshold number of the third items may be determined. For example, the third items that have characteristics that are similar to those of the first item may be associated with a potentially large number of item categories 110. However, if an item category 110 is common to a threshold number or threshold portion of the third items, then the determined characteristics that are similar to those of the first item are likely to be representative of the item category 110. Therefore, the determined item category 110 is likely to be suitable for association with the first item.

At 220, the first item may be associated with the second category. For example, the item data 106(1) shown at 202 may be replaced with item data 106(2) that includes the determined second category. In some implementations, an association between the first item and one or more other categories may be removed when the first item is associated with the second category. Because the second category is a more accurate category for the first item than the first category, and because the first item is also included in the catalog data 104, the process described with regard to FIG. 2 may become more accurate after each time that the process is performed. For example, each time that a category for an item is modified by replacing a current category with a more accurate category, the catalog data 104 that is used to generate a representative set of item characteristics 114 for an item category 110 is more accurate, resulting in more accurate identification of items that are not properly associated with particular categories.

Figure 3:
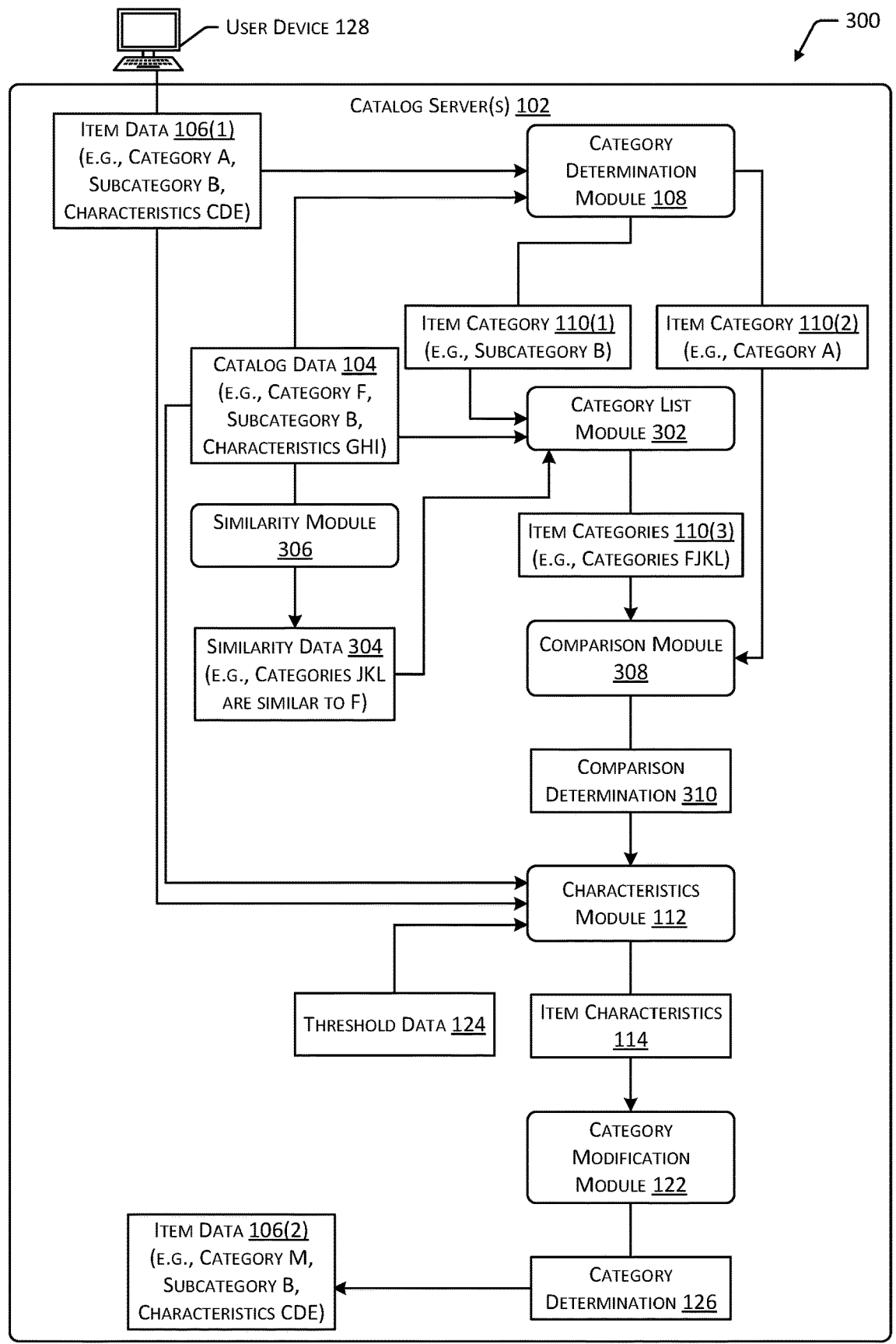
FIG. 3 is a block diagram depicting an implementation of a system for automatically determining possible miscategorization of an item with regard to a first category based on a second category associated with the item.

FIG. 3 is a block diagram 300 depicting an implementation of a system for automatically determining possible miscategorization of an item with regard to a first category based on a second category associated with the item. For example, a first item represented by item data 106(1) may be associated with multiple categories, such as a first item category 110(1) representing a specific category, such as a low-level browse node within a tree structure, and a second item category 110(2) representing a broader category, such as an indication of a product type associated with the item. In some cases, the first item category 110(1) may be a direct or indirect subcategory of the second item category 110(2). In other cases, the first and second item categories 110 may lack a relationship. In addition to associating multiple item categories 110 with an identifier of the item, the item data 106 may also indicate one or more item characteristics 114 of the item. In some implementations, the item data 106(1) may be provided to the catalog server(s) 102 by a user device 128. In other implementations, the item data 106(1) may be stored in data storage or another computing device accessible to the catalog server(s) 102. For example, the item data 106(1) may be part of the catalog data 104.

As described with regard to FIG. 1, one or more catalog servers 102 may access catalog data 104. Catalog data 104 may include information about multiple items. For example, the catalog data 104 may associate each item identifier for an item with one or more item categories 110, and one or more item characteristics 114 of the item. In some cases, one or more items represented by the catalog data 104 may be associated with multiple item categories 110. For example, items represented by the catalog data 104 may be associated with a first category indicative of a browse node associated with the item, and a second category indicative of a product type associated with the item. Typically, items that are associated with the same or similar granular (e.g., low-level or browse node) categories may be associated with the same or similar item characteristics 114. Additionally, items that are associated with the same or similar granular categories tend to be associated with the same or similar parent categories or other types of broader categories. While FIG. 3 depicts the catalog data 104 and item data 106 as separate elements for conceptual purposes, in some implementations, the item data 106 may represent an item that is included in the catalog data 104.

The category determination module 108 associated with the catalog server(s) 102 may determine the first item category 110(1) and the second item category 110(2) associated with the item data 106. For example, the category determination module 108 may be configured to determine portions of the item data 106(1) that are indicative of item categories 110 based on other categories indicated in the catalog data 104 or other data indicative of item categories 110 associated with the online store or entity. Correspondence between these determined categories and the item data 106(1) may be used to determine the particular item categories 110 associated with the item represented by the item data 106(1). As shown in FIG. 1, the item categories 110 associated with the item data 106(1) may include a fine-grained category (e.g., "Subcategory B") and a coarse-grained category (e.g., "Category A").

A category list module 302 associated with the catalog server(s) 102 may determine a list of item categories 110(3) based on the catalog data 104 and the first item category 110(1) associated with the item data 106(1). Specifically, the category determination module 108 may determine each item represented by the catalog data 104 that is associated with the first item category 110(1). Then, the category determination module 108 may determine other item categories 110(3) associated with those items of the catalog data 104 that correspond to the same or a similar type or level as the second item category 110(2). For example, if the first item category 110(1) includes a fine-grained browse node category of the item represented in the item data 106(1), and the second item category 110(2) includes a coarse-grained product type category of the item represented in the item data 106(1), the third item categories 110(3) may include a list or other data structure that includes each coarse-grained product type category for the items in the catalog data 104 that have the same fine-grained browse node category as the item represented by the item data 106(1).

In some implementations, the category list module 302 may also determine one or more item categories 110(3) that are similar or comparable to the item categories 110(3) associated with the catalog data 104. For example, the category list module 302 may access similarity data 304 that associates one or more item categories 110(3) with one or more other item categories 110(3) that have been determined to be similar or comparable to the first item categories 110(3). In some cases, the category list module 302 may also access threshold data 124, which may include threshold values indicative of parameters for determining whether a category is similar to one or more categories determined based on the catalog data 104.

A similarity module 306 associated with the catalog server(s) 102 may determine the similarity data 304 based on the co-occurrence of categories in the catalog data 104. For example, the similarity module 306 may determine a similarity matrix based on high-level categories that co-occur among items associated with the same low-level category. For a given low-level category, the similarity module 306 may determine the frequency for each high level category among items associated with the low level category. The high level category having the highest frequency may be determined as an anchor or seed category, with the number of occurrences of that category constituting a maximum value. This process may be repeated for each low level category associated with the catalog data 104 to determine co-occurrences of high level categories across multiple low level categories. One or more clustering algorithms may then be used to partition the high level categories of the catalog data 104 into groups based on co-occurrences of the high level categories across multiple low level categories. The category list module 302 may determine a set of categories that are similar to the categories determined based on the catalog data 104, the similarity data 304, and one or more threshold values. For example, the threshold value may indicate a k-value or other indication of a threshold portion of the maximum value for the category having the highest frequency, and all categories that occur at least the threshold portion of times may be included in the determined item categories 110(3).

In one implementation, a similarity matrix (M) for multiple parent categories may be determined using the following method:
1) "Cs" is the sorted list of all parent categories "C";
2) Set M as a zero matrix: |Cs|x|Cs|;
3) For each child category, aggregate the similarity among all Cs over all child categories by:
4) Determining the frequency "F" for each C for all items included in the child category;
5) Determine the parent category having the highest frequency "Fmax" as the anchor parent category "i" for the child category;
6) For each F, determine the index "j" of the category having the frequency F;
7) Determine M[i][j]+F;
8) Update the similarity matrix M based on the average: (M[i][j]+M[j][i])/2.

A comparison module 308 associated with the catalog server(s) 102 may determine correspondence between the second item category 110(2) of the item represented by the item data 106 and the item categories 110(3) associated with the catalog data 104 and similarity data 304. As described previously, the second item category 110(2) may include a direct or indirect parent of the first item category 110(1), however in some cases, the second item category 110(2) may be unrelated to the first item category 110(1). The item categories 110(3) determined based on the catalog data 104 may include categories that are within the same level of a tree structure, or same type, as the second item category 110(2), and that are associated with items from the catalog data 104 that have the same first item category 110(1) as the item represented by the item data 106(1). The item categories 110(3) determined based on the similarity data 304 may include additional categories that co-occur at least a threshold number of times with the item categories 110(3) determined based on the catalog data 104. The comparison module 308 may generate a comparison determination 310 indicative of whether the item category 110(2) of the item represented by the item data 106(1) occurs within the item categories 110(3) determined based on the catalog data 104 and similarity data 304. In other implementations, the comparison module 308 may determine whether the item category 110(2) of the item represented by the item data 106(1) is within a threshold similarity of the item categories 110(3).

If the item category 110(2) of the item represented by the item data 106(1) occurs within the determined item categories 110(3) or is within a threshold similarity, this may indicate that the current item category 110(2) indicated in the item data 106(1) is accurate. However, if the item category 110(2) of the item does not occur in the item categories 110(3), this may indicate that the broad item category 110(2) differs significantly from the categories of other items having the same specific item category 110(1) indicated in the item data 106(1), and that the item is potentially miscategorized.

To determine an accurate category for a potentially miscategorized item, the characteristics module 112 may determine item characteristics 114 associated with the item represented by the item data 106(1). As described with regard to FIG. 1, the characteristics module 112 may be configured to determine portions of the item data 106 that are indicative of item characteristics 114. In some implementations, the characteristics module 112 may access the catalog data 104 to determine characteristics that are associated with various items. In other cases, the characteristics module 112 may access other data indicative of item characteristics 114 associated with the online store or other entity. The characteristics module 112 may also determine item characteristics 114 associated with at least a subset of the items represented by the catalog data 104. For example, items represented by the catalog data 104 having identical or similar item characteristics 114 to those of the item represented by the item data 106 may have a high likelihood of being associated with a category that is relevant to the item represented by the item data 106.

Based on the determined item characteristics 114 and threshold data 124, the category modification module 122 may determine a category that occurs at least a threshold number of times in the set of items associated with the catalog data 104, or occurs for at least a threshold portion of the items in the set, and generate a category determination 126 indicative of this category. The item data 106(1) may then be modified to associate the item represented by the item data 106(1) with the category indicated in the category determination 126. For example, FIG. 3 depicts the category determination module 126 generating item data 106(2) that replaces a category associated with the initial item data 106(1) with a category determined using the category modification module 122.

Figure 4:
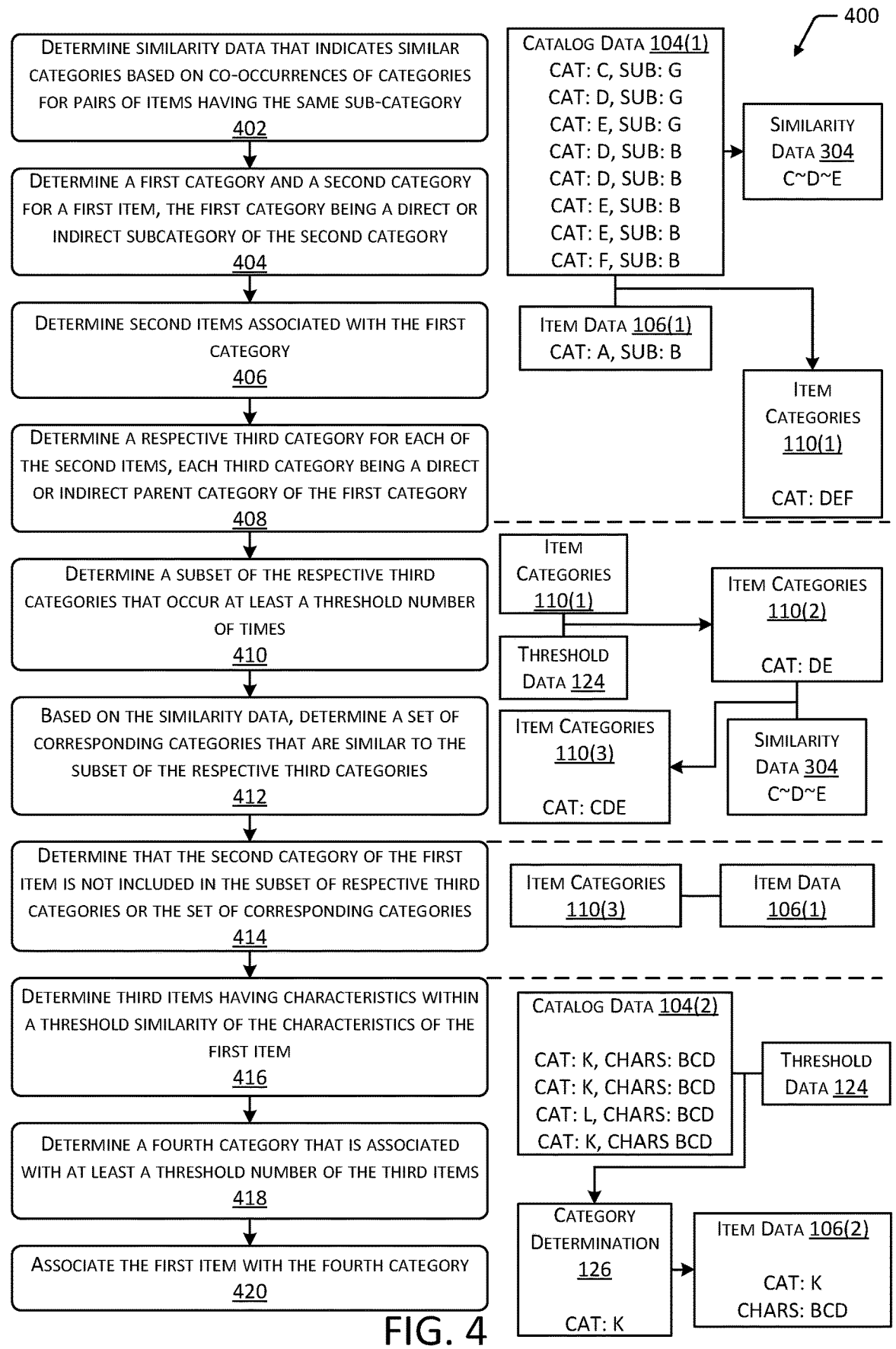
FIG. 4 is a flow diagram depicting an implementation of a method for automatically determining possible miscategorization of an item with regard to a first category based on a second category associated with the item.

FIG. 4 is a flow diagram 400 depicting an implementation of a method for automatically determining possible miscategorization of an item with regard to a first category based on a second category associated with the item. At 402, similarity data 304 that indicates similar categories may be determined based on co-occurrences of categories for pairs of items having the same sub-category. As described with regard to FIG. 3, catalog data 104(1) may represent multiple items, each item being associated with a broad category and a direct or indirect subcategory. For a given subcategory, the frequency of corresponding broad categories may be determined, with the broad category having the highest frequency being determined as an anchor or seed category for the subcategory. This process may be repeated across multiple subcategories, and co-occurrences of broad categories may be used to determine broad categories that are similar or comparable to one another.

At 404, a first category and a second category for a first item may be determined, the first category being a direct or indirect subcategory of the second category. For example, as described with regard to FIG. 3, item data 106(1) that represents an item may associate an item identifier with item categories 110 and one or more item characteristics 114(1). A category determination module 108 or other module associated with a catalog server 102 or other type of computing device may determine the item categories 110(1) of the item based on the item data 106.

At 406, second items associated with the first category may be determined. As described with regard to FIG. 3, catalog data 104(1) may associate item identifiers for multiple items with respective item categories 110 and respective item characteristics 114. A category list module 302 or other module associated with the catalog server 102 or other type of computing device may determine each item represented by the catalog data 104(1) that is associated with the same first category as the item represented by the item data 106(1).

At 408, a respective third category is determined for each of the second items, each third category being a direct or indirect parent category of the first category. For example, different items represented by the catalog data 104(1) that are associated with the same subcategory as the first item may be associated with different parent categories that are of the same level within a tree structure or the same type of category as the second category. As described with regard to FIG. 3, a category list module 302 or other module associated with the catalog server 102 or other type of computing device may determine a list or other data structure that indicates the parent categories associated with the second items.

At 410, a subset of the respective third categories that occur at least a threshold number of times may be determined, shown as item categories 110(2) in FIG. 4. For example, the catalog list module 302, comparison module 308, or other module associated with the catalog server 102 or other computing device may determine counts or portions of particular third categories that occur, and may determine the subset of respective third categories based on correspondence between these counts or portions and threshold data 124. Continuing the example, third categories that do not occur at least a threshold count or portion of times within the set of third categories may be less likely to be accurate categories associated with items that are associated with the same subcategory as the first item. Conversely, third categories that occur frequently among the second items may be more likely to be accurate categories for the first item and other items associated with the same subcategory.

At 412, based on the similarity data 304, a set of corresponding categories that are similar to the subset of the respective third categories may be determined. As described previously, the similarity data 304 may indicate categories that are similar or comparable to other categories, based on co-occurrences of these categories among items associated with the same subcategory. Therefore, a category that is associated with another category in the similarity data 304 is likely to be an accurate substitution. The item categories 110 represented by the item data 106(1) may then be compared to the item categories 110(3) represented by the corresponding portion of the catalog data 104(1) and the similarity data 304.

At 414, a determination may be made that the second category of the first item is not included in the subset of respective third categories or the set of corresponding categories. In other implementations, a determination may be made that the second category is not within a threshold similarity of the respective third categories or corresponding categories. Because the second category of the first item is not associated with any of the categories that occur at least a threshold number of times among other items having the same subcategory as the first item, this determination may indicate that the second category for the first item may be inaccurate, and that the first item is potentially miscategorized. In cases where the second category corresponds to the third categories or similar categories, this may indicate that the item represented by the item data 106(1) is not miscategorized, and the steps indicated at 416, 418, and 420 may be omitted.

At 416, third items having characteristics that are within a threshold similarity of the characteristics of the first item, depicted as catalog data 104(2), may be determined. For example, in response to a determination that the second category of the first item is not included in the subset of third categories or in the set of categories similar or comparable to the subset, a category modification module 122 or other module associated with the catalog server 102 or other computing device may determine correspondence between item characteristics 114(1) of the first item and the catalog data 104, which indicates characteristics 114 of other items. Based on this correspondence, a third set of items having characteristics that are similar to the item characteristics 114(1) of the first item may be determined. As described previously, items having characteristics that are similar to the characteristics of the first item are likely to be associated with the same item category 110 or a similar Item category 110.

At 418, a fourth category that is associated with at least a threshold number of the third items may be determined. For example, the third items that have characteristics that are similar to those of the first item may be associated with various item categories 110. However, if an item category 110 is common to a threshold number or threshold portion of the third items, which have characteristics similar to those of the first item, the determined item category 110 is likely to be suitable for association with the first item.

At 420, the first item may be associated with the fourth category by generating item data 106(2) or by modifying the initial item data 106(1) to form the item data 106(2). In some implementations, an association between the first item and one or more other categories may be removed when the first item is associated with the fourth category. Because the fourth category is a more accurate category for the first item than the second category, the process described with regard to FIG. 4 may become more accurate after each time that the process is performed by updating the catalog data 104. For example, each time that a category for an item is modified by replacing a current category with a more accurate category, the catalog data 104 that is used to generate a list of categories that co-occur with a particular subcategory is more accurate, resulting in more accurate identifications of items that are not properly associated with particular categories.

Figure 5:
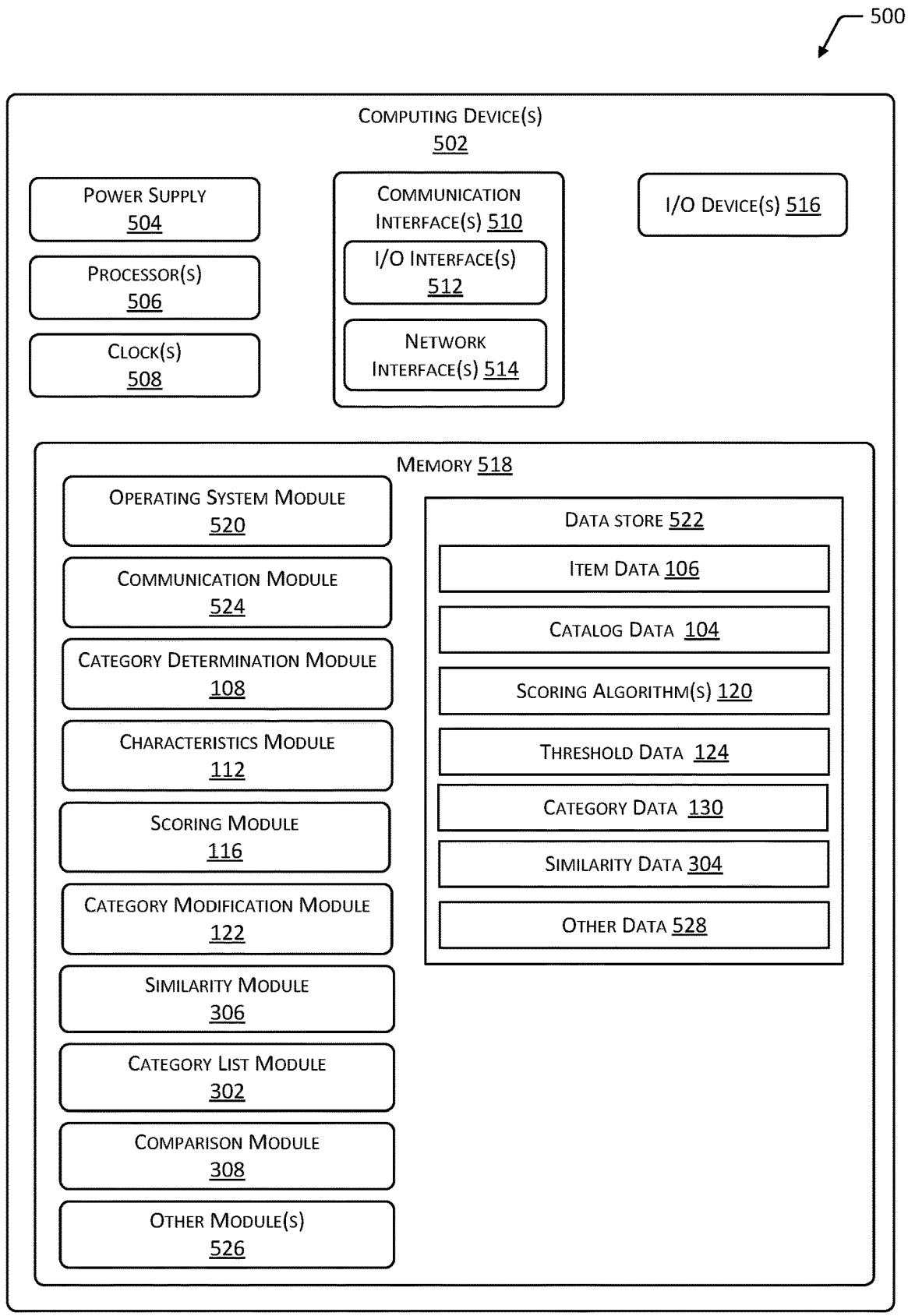
FIG. 5 is a block diagram depicting an implementation of a computing device within the present disclosure.

FIG. 5 is a block diagram 500 depicting an implementation of a computing device 502 within the present disclosure. The computing device 502 may include one or more catalog servers 102, as described with regard to FIGS. 1-4. However, in other implementations, one or more other computing devices 502 in communication with a catalog server 102 may be used to perform one or more of the functions described herein. For example, different computing devices 502 may store catalog data 104 and item data 106 and provide information regarding item categories 110 or item characteristics 114 to other computing devices 502, which may determine correspondence scores 118 or lists of item categories 110 and provide category determinations 126 to other computing devices 502. As another example, different computing devices 502 may determine similarity data 304, store machine learning modules that may be used to partition or cluster item categories 110, determine correspondence scores 118 that indicate differences in item characteristics 114, select threshold values, such as a threshold value to cause a target number or target portion of items to be determined as potentially miscategorized, and so forth. As such, while FIG. 5 depicts a single block diagram 500, the depicted computing device 502 may include any number of computing devices of similar or different types.

One or more power supplies 504 may be configured to provide electrical power suitable for operating the components of the computing device 502. In some implementations, the power supply 504 may include a rechargeable battery, fuel cell, photovoltaic cell, power conditioning circuitry, and so forth.

The computing device 502 may include one or more hardware processor(s) 506 (processors) configured to execute one or more stored instructions. The processor(s) 506 may include one or more cores. One or more clock(s) 508 may provide information indicative of date, time, ticks, and so forth. For example, the processor(s) 506 may use data from the clock 508 to generate a timestamp, trigger a preprogrammed action, and so forth.

The computing device 502 may include one or more communication interfaces 510, such as input/output (I/O) interfaces 512, network interfaces 514, and so forth. The communication interfaces 510 may enable the computing device 502, or components of the computing device 502, to communicate with other computing devices 502 or components of the other computing devices 502. The I/O interfaces 512 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 512 may couple to one or more I/O devices 516. The I/O devices 516 may include any manner of input devices or output devices associated with the computing device 502. For example, I/O devices 516 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 516 may be physically incorporated with the computing device 502. In other implementations, I/O devices 516 may be externally placed.

The network interfaces 514 may be configured to provide communications between the computing device 502 and other devices, such as the I/O devices 516, routers, access points, and so forth. The network interfaces 514 may include devices configured to couple to one or more networks including local area networks (LANs), wireless LANs (WLANs), wide area networks (WANs), wireless WANs, and so forth. For example, the network interfaces 514 may include devices compatible with Ethernet, Wi-Fi, Bluetooth, ZigBee, Z-Wave, 5G, LTE, and so forth.

The computing device 502 may include one or more buses or other internal communications hardware or software that allows for the transfer of data between the various modules and components of the computing device 502.

As shown in FIG. 5, the computing device 502 may include one or more memories 518. The memory 518 may include one or more computer-readable storage media (CRSM). The CRSM may be any one or more of an electronic storage medium, a magnetic storage medium, an optical storage medium, a quantum storage medium, a mechanical computer storage medium, and so forth. The memory 518 may provide storage of computer-readable instructions, data structures, program modules, and other data for the operation of the computing device 502. A few example modules are shown stored in the memory 518, although the same functionality may alternatively be implemented in hardware, firmware, or as a system on a chip (SoC).

The memory 518 may include one or more operating system (OS) modules 520. The OS module 520 may be configured to manage hardware resource devices such as the I/O interfaces 512, the network interfaces 514, the I/O devices 516, and to provide various services to applications or modules executing on the processors 506. The OS module 520 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Washington, USA; or other operating systems.

One or more data stores 522 and one or more of the following modules may also be associated with the memory 518. The modules may be executed as foreground applications, background tasks, daemons, and so forth. The data store(s) 522 may use a flat file, database, linked list, tree, executable code, script, or other data structure to store information. In some implementations, the data store(s) 522 or a portion of the data store(s) 522 may be distributed across one or more other devices including other computing devices, network attached storage devices, and so forth.

A communication module 524 may be configured to establish communications with one or more other computing devices 502. Communications may be authenticated, encrypted, and so forth.

The memory 518 may also store the category determination module 108. The category determination module 108 may determine item categories 110 of items represented by item data 106 and catalog data 104. The category determination module 108 may be configured to determine portions of data that correspond to item categories 110. In some implementations, the category determination module 108 may access catalog data 104 to determine indications of categories that occur at least a threshold number of times in the catalog data 104, which may be determined as current categories in use by an online store or other entity. In other implementations, the category determination module 108 may access other data indicative of item categories 110.

The memory 518 may additionally store the characteristics module 112. The characteristics module 112 may determine portions of item data 106 and catalog data 104 that are indicative of item characteristics 114 of items represented by the data. In some implementations, the characteristics module 112 may access the catalog data 104 to determine characteristics that are associated with various items. For example, characteristics that occur in the catalog data 104 at least a threshold number of times may represent item characteristics 114 currently in use by an online store or other entity. In other implementations, the characteristics module 112 may access other data indicative of item characteristics 114.

The memory 518 may store the scoring module 116. The scoring module 116 may determine correspondence scores 118 based on correspondence between the item characteristics 114 associated with a first item and item characteristics 114 associated with one or more other items. The scoring module 116 may access scoring algorithms 120 which may include various rules, algorithms, weights, thresholds, and so forth that may be used to determine the correspondence score 118 based on differences between item characteristics 114. For example, different types or magnitudes of differences may be associated with different weights, rules, and so forth. In some cases, the correspondence score 118 may include a numerical value. In other implementations, the correspondence score 118 may include non-numerical indications, such as qualitative indications of the differences between item characteristics 114.

The memory 518 may also store the category modification module 122. The category modification module 122 may determine whether a correspondence score 118 associated with a particular item differs from a threshold score by at least a threshold amount, or whether an item category 110 for an item differs from a list of item categories 110 associated with other items. Based on this this determination, the category modification module 122 may determine a set of items having item characteristics 114 that correspond to the item characteristics 114 of the particular item. The category modification module 122 may determine a category that occurs at least a threshold number of times in the set of items, or occurs for at least a threshold portion of the items in the set, and generate a category determination 126 indicative of this category. Item data 106 for the particular item may then be modified to associate the item represented by the item data 106 with the category indicated in the category determination 126.

The memory 518 may additionally store the similarity module 306. The similarity module 306 may determine similarity data 304 based on the co-occurrence of item categories 110 in catalog data 104. In some implementations, the similarity module 306 may determine a similarity matrix based on high-level categories that co-occur among items associated with the same low-level category. For example, for a given low-level category, the similarity module 306 may determine the frequency for each high level category among items associated with the low-level category. The high level category having the highest frequency may be determined as an anchor or seed category, with the number of occurrences of that category constituting a maximum value. This process may be repeated for each low-level category associated with the catalog data 104 to determine co-occurrences of high level categories across multiple low-level categories. One or more clustering algorithms may be used to partition the high-level categories into groups based on co-occurrences of the high level categories across multiple low-level categories.

The memory 518 may store the category list module 302. The category list module 302 may determine a list of high-level item categories 110 based on items represented by the catalog data 104 that share a lower-level item category 110 with a particular item. For example, the category list module 302 may determine each item represented by the catalog data 104 that is associated with the lower-level item category 110 of the particular item. Then, the category list module 302 may determine higher-level item categories 110 associated with those items. In some implementations, the category list module 302 may also determine, based on the similarity data 304, one or more additional item categories 110 that are similar or comparable to the item categories 110 associated with the catalog data 104.

The memory may also store the comparison module 308. The comparison module 308 may determine correspondence between an item category 110 associated with a particular item, such as an item represented by item data 106, and item categories 110 associated with other items represented by the catalog data 104. For example, as described with regard to FIG. 3, the category list module 302 may determine higher-level item categories 110 of items represented by catalog data 104 that are associated with the same lower-level item category 110 as the item represented by the item data 106. The comparison module 308 may generate a comparison determination 310 indicative of whether the item category 110 of the item represented by the item data 106 occurs within the item categories 110 determined based on the catalog data 104. In some implementations, the comparison determination 310 may also be based on additional item categories 110 that are determined based on similarity data 304, to be similar to the item categories 110 determined based on the catalog data 104.

Other modules 526 may also be present in the memory 518. For example, other modules 526 may include permission or authorization modules for modifying data associated with the computing device 502, such as threshold values, configurations or settings, and so forth. Other modules 526 may also include encryption modules to encrypt and decrypt communications between computing devices 502, authentication modules to authenticate communications sent or received by computing devices 502, user interface modules to generate interfaces for presenting output, receiving input from users, and so forth. Other modules 526 may include machine learning modules that may partition, cluster, or classify item categories 110, item characteristics 114, and so forth based on co-occurrences of item categories 110 or item characteristics 114.

Other data 528 within the data store(s) 522 may include configurations, settings, preferences, and default values associated with computing devices 502. Other data 528 may also include encryption keys and schema, access credentials, and so forth. Other data 528 may also include training data for machine learning systems.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more non-transitory memories storing computer-executable instructions; and
one or more hardware processors to execute the computer-executable instructions to, automatically, without human intervention:
   determine, using the one or more hardware processors, a first category associated with a first item;
   determine, using the one or more hardware processors, a first set of characteristics of the first item based on item data stored in the one or more non-transitory memories, wherein the item data associates the first set of characteristics with an identifier indicative of the first item;
   determine, using the one or more hardware processors and based on the item data, a plurality of second items associated with the first category, wherein the item data associates an indication of the first category with the plurality of second items;
   determine, using the one or more hardware processors and based on the item data, for each second item of the plurality of second items, a respective second set of characteristics, wherein the item data associates a respective identifier indicative of each second item with a corresponding respective set of characteristics;
   determine, using the one or more hardware processors, a third set of characteristics, wherein at least a threshold count of each characteristic of the third set is included in the respective second sets of characteristics;
   determine, using the one or more hardware processors, a score based on one or more differences between the first set of characteristics and the third set of characteristics; and
   in response to the score differing from a threshold score by at least a threshold value:
      determine, using the one or more hardware processors and based on the item data, a plurality of third items, wherein each third item of the plurality of third items is associated with a respective fourth set of characteristics that is within a threshold similarity of the first set of characteristics;
determine, using the one or more hardware processors and based on the item data, a second category associated with at least a first threshold portion of the plurality of third items; and
modify, using the one or more hardware processors, item data indicative of the first item to change an association between the first item and the first category to an association between the first item and the second category.

2. The system of claim 1, further comprising computer-executable instructions to:
determine a third category associated with the first item, wherein the first category is a subcategory of the third category;
determine, for each second item of the plurality of second items, a respective fourth category, wherein the first category is a subcategory of each respective fourth category;
determine a subset of fourth categories that are associated with at least a threshold number of the plurality of second items;
determine that the third category is not included in the subset of fourth categories; and
in response to the third category not being included in the subset of fourth categories:
determine a fourth category of the subset of fourth categories that is associated with at least a second threshold portion of the plurality of third items; and
associate the first item with the fourth category.

3. The system of claim 1, further comprising computer-executable instructions to:
determine a third category associated with the first item, wherein the first category is a subcategory of the third category;
determine, for each second item of the plurality of second items, a respective fourth category, wherein the first category is a subcategory of each respective fourth category;
determine a subset of fourth categories that are associated with at least a threshold number of the plurality of second items;
determine, based on similarity data that associates each fourth category of the subset of fourth categories with corresponding fifth categories, a set of fifth categories that are similar to the subset of fourth categories;
determine that the third category is not included in the subset of fourth categories or the set of fifth categories; and
in response to the third category not being included in the subset of fourth categories or the set of fifth categories:
determine a fourth category of the subset of fourth categories that is associated with at least a second threshold portion of the plurality of third items; and
associate the first item with the fourth category.

4. A system comprising:
one or more non-transitory memories storing computer-executable instructions; and
one or more hardware processors to execute the computer-executable instructions to automatically:
determine, using the one or more hardware processors and based on item data stored in the one or more non-transitory memories, a first category and a first set of characteristics associated with a first item, wherein the item data associates the first category and the first set of characteristics with an indication of the first item;
determine, using the one or more hardware processors and based on the item data:
a plurality of second items associated with the first category, and
a respective second set of characteristics for each second item of the plurality of second items, wherein the item data associates each second item with the first category and with a corresponding respective second set of characteristics;
based on the respective second sets of characteristics and a first representative set of characteristics associated with a second category, determine, using the one or more hardware processors, a second representative set of characteristics associated with the first category, wherein the second representative set of characteristics associated with the first category differs from the first representative set of characteristics associated with the second category;
determine, using the one or more hardware processors, one or more differences between the first set of characteristics and the second representative set of characteristics;
in response to the one or more differences, determine, using the one or more hardware processors and based on the item data, one or more third items associated with a third set of characteristics that correspond to the first set of characteristics;
determine, using the one or more hardware processors and based on the item data, a third category associated with the one or more third items; and
modify, using the one or more hardware processors, item data associated with the first item to indicate the third category.

5. The system of claim 4, further comprising computer-executable instructions to:
train a machine learning system to determine the second representative set of characteristics using at least a first subset of the respective second sets of characteristics and at least a second subset of the first representative set of characteristics as inputs; and
use the machine learning system to determine the second representative set of characteristics using at least a third subset of the respective second sets of characteristics as inputs.

6. The system of claim 4, further comprising computer-executable instructions to:
after modifying the item data to indicate the third category, train a machine learning system to determine a fourth set of characteristics associated with the second category using:
the first set of characteristics of the first item, and
a plurality of fifth sets of characteristics associated with a plurality of fourth items that are associated with the second category.

7. The system of claim 4, further comprising computer-executable instructions to:
determine a score based on one or more of:
a count of the one or more differences, or
a magnitude of the one or more differences; and
determine that the score differs from a threshold score by at least a threshold value;
wherein the one or more third items are determined further in response to the score differing from the threshold score by at least the threshold value.

8. The system of claim 7, further comprising computer-executable instructions to:
- determine a set of scores associated with the plurality of second items;
- determine a target portion of the plurality of second items;
- determine, based on the set of scores, a first score at which the target portion of the plurality of second items are associated with a score that differs from the first score by at least the threshold value; and
- use the first score as the threshold score.

9. The system of claim 4, further comprising computer-executable instructions to:
- determine a fourth category associated with the first item;
- determine, for each second item of the plurality of second items, a respective fifth category;
- determine that the fourth category is not included in the respective fifth categories; and
- in response to the fourth category not being included in the respective fifth categories:
  - determine a fifth category of the respective fifth categories that is associated with at least a threshold portion of the one or more third items; and
  - associate the first item with the fifth category.

10. The system of claim 9, wherein the first category is a subcategory of the fourth category.

11. The system of claim 4, further comprising computer-executable instructions to:
- determine a fourth category associated with the first item;
- determine, for each second item of the plurality of second items, a respective fifth category;
- determine a subset of fifth categories that are associated with at least a threshold number of the plurality of second items;
- determine, based on similarity data that associates each fifth category of the subset of fifth categories with one or more respective corresponding sixth categories, a set of sixth categories that are similar to the subset of fifth categories;
- determine that the fourth category is not included in the subset of fifth categories or the set of sixth categories; and
- in response to the fourth category not being included in the subset of fifth categories or the set of sixth categories:
  - determine a fifth category of the respective fifth categories that is associated with at least a threshold portion of the one or more third items; and
  - associate the first item with the fifth category.

12. The system of claim 11, further comprising computer-executable instructions to:
- determine a target portion of the plurality of second items;
- determine a portion of the respective fifth categories and the set of sixth categories that corresponds to the target portion of the plurality of second items; and
- determine the at least a threshold number of the plurality of second items based on the portion of the respective fifth categories and the set of sixth categories.

13. A system comprising:
- one or more non-transitory memories storing computer-executable instructions; and
- one or more hardware processors to execute the computer-executable instructions to automatically:
  - determine, using the one or more hardware processors and based on item data stored in the one or more non-transitory memories, a first category and a second category associated with a first item, wherein the item data associates an indication of the first item with the first category and the second category;
  - determine, using the one or more hardware processors, a plurality of second items that are associated with the first category based on the item data, wherein the item data associates the first category with the plurality of second items;
  - determine, using the one or more hardware processors, for at least a first subset of the plurality of second items, a respective third category based on the item data, wherein the item data associates each second item of the at least a first subset of the plurality of second items with a corresponding respective third category;
  - determine, using the one or more hardware processors, that the second category of the first item is not within a threshold similarity of the respective third categories; and
  - in response to the second category not being within the threshold similarity of the respective third categories:
    - determine, using the one or more hardware processors and based on the item data, a third category of the respective third categories that is associated with at least a threshold portion of the at least a first subset of the plurality of second items; and
    - modify, using the one or more hardware processors, item data associated with the first item to indicate the third category.

14. The system of claim 13, further comprising computer-executable instructions to:
- determine a subset of the respective third categories that is associated with at least a threshold portion of the at least a first subset of the plurality of second items;
- wherein the second category of the first item is not within the threshold similarity of the subset of the respective third categories.

15. The system of claim 14, further comprising computer-executable instructions to:
- determine a target portion of the plurality of second items;
- determine a portion of the respective third categories that corresponds to the target portion of the plurality of second items; and
- determine the at least a threshold portion of the at least a first subset of plurality of second items based on the portion of the respective third categories.

16. The system of claim 13, further comprising computer-executable instructions to:
- determine a set of fourth categories based on similarity data that associates each of the respective third categories with the set of fourth categories that are similar to the respective third category;
- wherein the second category of the first item is not within the threshold similarity of the set of fourth categories.

17. The system of claim 16, further comprising computer-executable instructions to:
- determine, for each pair of categories within a plurality of categories, a count of instances that the pair of categories is associated with an item; and
- determine the similarity data based on the count of instances.

18. The system of claim 13, further comprising computer-executable instructions to:
- determine a first set of characteristics of the first item;
- determine, based on at least a second subset of the plurality of second items, a second set of characteristics;

determine one or more differences between the first set of characteristics and the second set of characteristics; and in response to the one or more differences:
- determine one or more third items associated with a third set of characteristics that correspond to the first set of characteristics;
- determine a fourth category associated with the one or more third items; and
- associate the first item with the fourth category.

19. The system of claim 18, further comprising computer-executable instructions to:

determine a score based on one or more of a count or a magnitude of the one or more differences; and determine that the score differs from a threshold score by at least a threshold value;

wherein the one or more third items are determined further in response to the score differing from the threshold score by at least the threshold value.

20. The system of claim 13, wherein the first category is a subcategory of the third category.

* * * * *